United States Patent [19]

Cohn et al.

[11] Patent Number: 4,984,760
[45] Date of Patent: Jan. 15, 1991

[54] DUAL-USE HOLDER FOR POCKET-SIZED ELECTRONIC APPLIANCE OR THE LIKE

[76] Inventors: Arnold K. Cohn, 1415 Meadow La., Glenview, Ill. 60025; Charles W. Elterman, 20777 N. Laurel Dr., Barrington, Ill. 60010

[21] Appl. No.: 390,604

[22] Filed: Aug. 7, 1989

[51] Int. Cl.⁵ .............................................. F16M 13/00
[52] U.S. Cl. .................. 248/126; 248/206.3; 248/313
[58] Field of Search ............ 248/126, 206.3, 451, 248/310, 311.2, 311.3, 313, 455, 460, 309.1, 470, 441.1, 549, 205.5, 206.2, 684, 207, 467; 24/306, 442

[56] References Cited

U.S. PATENT DOCUMENTS

| | | | |
|---|---|---|---|
| 624,919 | 5/1899 | Foger | 248/126 X |
| 651,129 | 6/1900 | Becker | 248/470 |
| 994,913 | 6/1911 | Elliott | 248/126 X |
| 1,315,326 | 9/1919 | Palis | 248/126 X |
| 1,739,801 | 12/1929 | Pitts | 248/206.3 X |
| 1,885,103 | 11/1932 | Barnett | 248/206.1 |
| 2,286,389 | 6/1942 | Sowin | 248/205.5 X |
| 2,605,891 | 8/1952 | Jones, Jr. | 248/313 X |
| 2,877,976 | 3/1959 | Massari | 248/313 |
| 3,011,649 | 12/1961 | Porter | 248/205.5 X |
| 3,224,720 | 12/1965 | Hai | 248/313 |
| 3,966,160 | 6/1976 | Wilson | 248/311.3 |
| 4,136,805 | 1/1979 | Storms | 248/310 X |
| 4,602,761 | 7/1986 | Carter | 248/300 X |

FOREIGN PATENT DOCUMENTS 876073  8/1961  United Kingdom ............. 248/205.5

*Primary Examiner*—Alvin C. Chin-Shue
*Attorney, Agent, or Firm*—Dressler, Goldsmith, Shore, Sutker & Milnamow, Ltd.

[57] ABSTRACT

A dual-use holder for a pocket-sized electrical appliance. In a first orientation, the holder can be steadily rested on a generally horizontal surface, such as a shelf or on a table or desk top, with the appliance in a generally upright position. In a second orientation, the holder can be removably mounted to a generally vertical surface, such as a mirror or window surface, again with the appliance in a generally upright position. The holder has integral back and bottom walls, which support the appliance. Preferably, the holder has a strap, which straps the appliance to the back wall. Alternatively, the holder has integral side and front walls, which with the back and bottom walls define an open-topped box, and the appliance is inserted into such box. The holder has a prop, which is mounted to the back wall. The holder has a suction cup, or suction cups, which is or are attached to the prop and is or are used to mount the holder removably to a hard, smooth, non-porous surface.

8 Claims, 2 Drawing Sheets

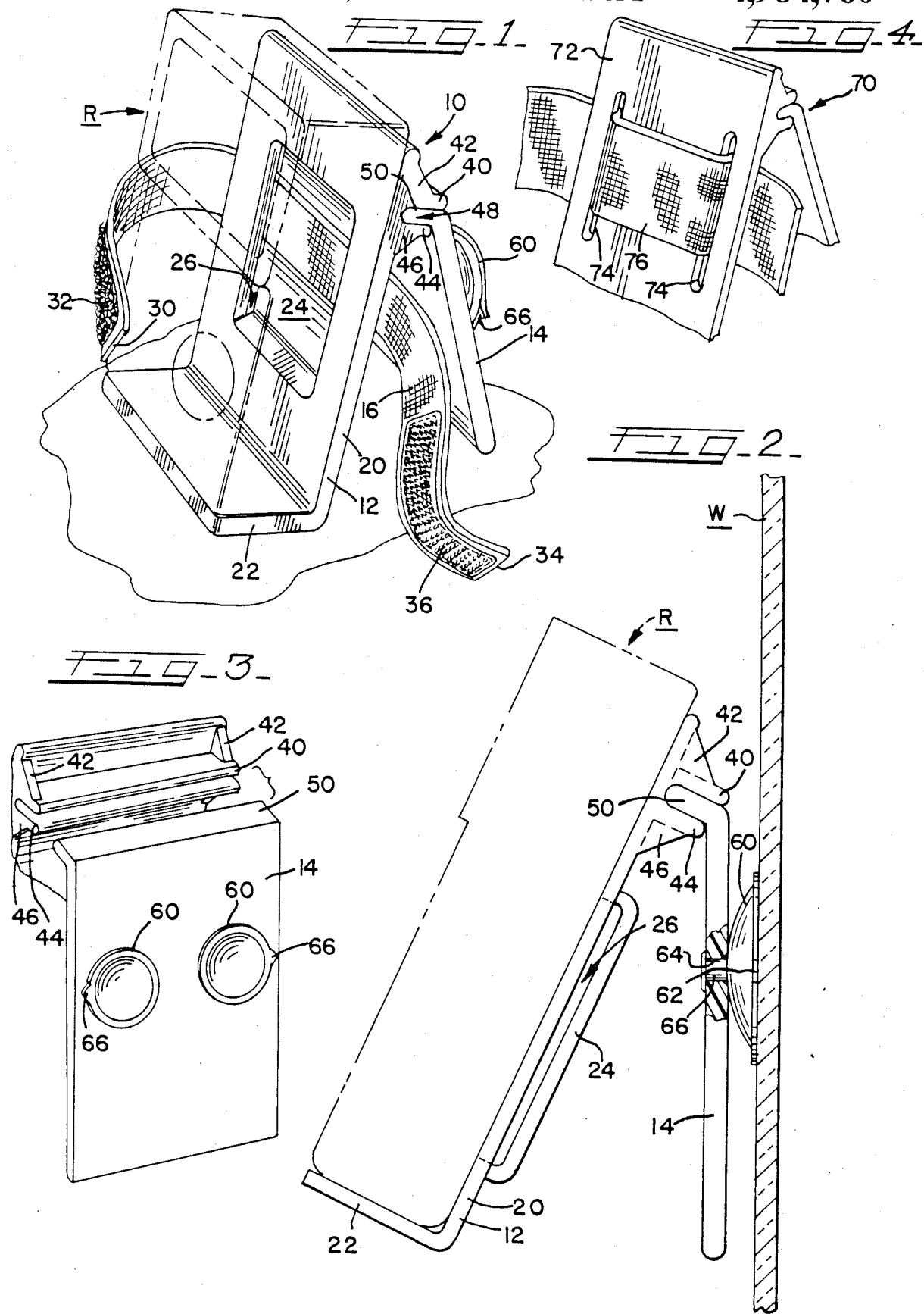

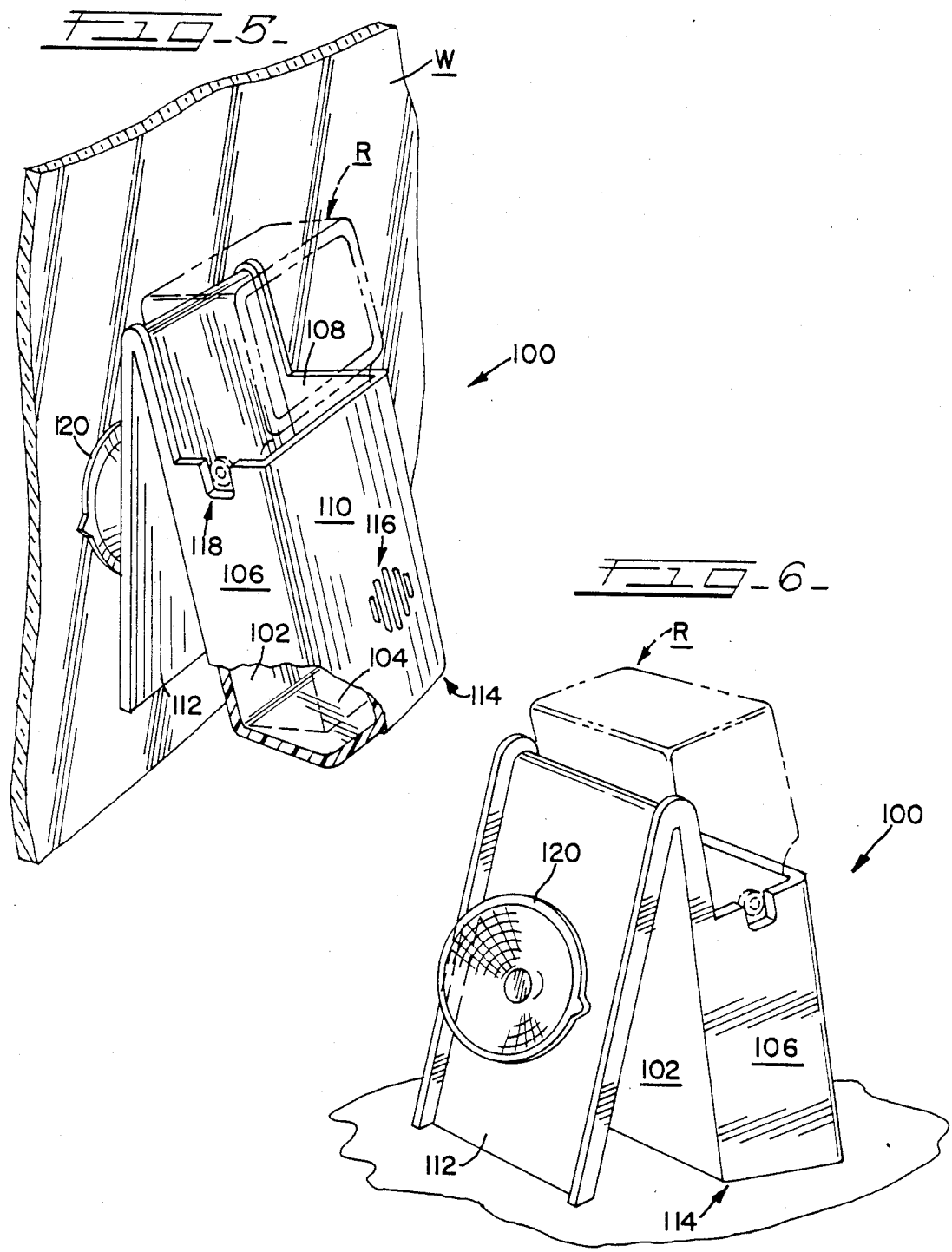

DUAL-USE HOLDER FOR POCKET-SIZED ELECTRONIC APPLIANCE OR THE LIKE

TECHNICAL FIELD OF THE INVENTION

This invention pertains to a holder for a pocket-sized electronic appliance or the like. The holder can be securely rested on a generally horizontally surface or removably attached to a generally vertical surface.

BACKGROUND OF THE INVENTION

In recent years, pocket-sized, battery-powered, electronic appliances have become very popular adjuncts to modern lifestyles. These appliances, which may be also described as "personal size", include television receivers, radio receivers, compact disc players, cassette tape players, and various combinations of such receivers and such players.

Typically, because of its compactness and light weight, such an appliance can be conveniently carried in a pants, shirt, or jacket pocket, or clipped to a belt. However, such an appliance may have a small base, which may not permit the appliance to be steadily rested on its base. Accordingly, its utility would be greatly enhanced if such an appliance could be steadily rested, in a generally upright position, on a generally horizontal surface.

Furthermore, its utility would be greatly enhanced if such an appliance could be removably attached, in a generally upright position, to a generally vertical surface.

SUMMARY OF THE INVENTION

This invention provides a holder for a pocket-sized electronic appliance, which may be battery-powered, such as a television or radio receiver or a player for compact discs or cassette tapes. The holder has dual uses, as explained below.

Thus, the holder is useful in a first orientation, in which the holder can be steadily rested on a generally horizontally surface, such as a shelf or a table or desk top. Also, the holder is useful in a second orientation, in which the holder can be removably attached to a generally vertical surface, such as a mirror surface, a window surface in a building or a motor vehicle, or a glazed surface of a piece of ceramic tile.

In either orientation, the holder enables someone to watch a television program on a pocket-sized television receiver, to listen to a radio program on a pocket-sized radio receiver, or to listen to recorded music or other recorded material on a pocket-sized player for compact discs or cassette tapes, with the pocket-sized appliance in a generally upright position.

If attached to a vertical mirror surface in a bathroom, or if attached to a glazed surface of a piece of ceramic tile on a bathroom wall, the holder enables someone to watch or listen, as mentioned, while washing himself or herself. If attached to a window surface in a kitchen, over a sink, the holder enables someone to do so while washing dishes. If attached to a window surface facing a back seat of an automobile, the holder enables occupants of the back seat to do so while riding or waiting in the automobile. The holder can be similarly attached in a variety of similar and dissimilar situations.

The holder has a back wall, which prevents such an appliance from falling backwardly as held by the holder in either orientation. The holder has means for preventing the appliance from falling forwardly, laterally, or downwardly as held by the holder in either orientation.

The holder has a prop, which is attached to the back wall. The prop is adapted to prevent the holder from tipping backwardly when the holder is rested on a generally horizontal surface. The prop also has means attached to the prop for removably mounting the holder in its second orientation to a generally vertical surface.

In a preferred embodiment, the first-mentioned means comprises a bottom wall, which is integral with the back wall, and a strap, which is arranged to strap such an appliance against the back wall. Two opposite ends of the strap are adapted to be releaseably fastened to each other.

Preferably, the opposite ends of the strap are provided respectively, on opposite faces of the strap, with interengagable hook and loop portions of a hook-and-loop fastener, such as a Velcro TM fastener available commercially. The hook-and-loop fastener enables the opposite ends of the strap to be releaseably fastened to each other, so as to strap such an appliance to the back wall, if the appliance has a girth within a range of girths that the hook-and-loop fastener can accommodate. The opposite ends of the strap may be alternatively provided with interengagable parts of conventional snap or buckle fasteners or may be merely tied to each other.

In an alternative embodiment, the holder has certain walls defining an open-topped box, namely a back wall, a bottom wall, two side walls, and a front wall. Such an appliance can be vertically inserted into the open-topped box if the front-to-back and side-to-side measurements of the appliance are such as to permit it to fit into the box. Moreover, the back prop and the various walls noted above can be advantageously made as a single piece, e.g., molded as a single piece from a suitable polymeric material.

Preferably, the second-mentioned means comprises a suction cup, or a plurality of suction cups, which is or are attached to the back prop so as to face backwardly. Thus, via the suction cup or suction cups, the holder can be removably mounted to a compatible surface, such as a mirror surface, a window surface, or a glazed surface of a piece of ceramic tile. Generally, any hard, smooth, non-porous surface is compatible with the suction cup or suction cups.

These and other objects, features, and advantages of this invention are evident from the following description of a preferred and certain alternative embodiments of this invention with reference to the accompanying drawings.

BRIEF DESCRIPTION OF THE DRAWINGS

FIG. 1 is a perspective view of a dual-use holder for a pocket-sized electronic appliance, as exemplified by a pocket-sized television receiver shown in phantom lines, the holder constituting a preferred embodiment of this invention.

FIG. 2 is a slightly enlarged, elevational view of one side of the holder, as used to hold the receiver shown again in phantom lines, and as mounted removably to a window surface.

FIG. 3 is a fragmentary, exploded, perspective view of the holder, as shown in FIG. 1 but shown from a different vantage.

FIG. 4 is a fragmentary, perspective view of such a holder according to an alternative embodiment of this invention.

FIG. 5 is a perspective view of such a holder according to another alternative embodiment of this invention, as used to hold the receiver shown again in phantom lines, and as attached to a window surface.

FIG. 6 is a perspective view of the holder of FIG. 5, as used to hold the receiver shown again in phantom lines, and as rested on a generally horizontal surface.

DETAILED DESCRIPTION OF ILLUSTRATED EMBODIMENTS

As shown in FIGS. 1 through 3, a holder 10 for a pocket-sized electronic appliance, as exemplified by a pocket-sized television receiver R shown in phantom lines, constitutes a preferred embodiment of this invention. The holder 10 has dual uses, as explained below.

In a first orientation, in which the holder 10 is shown in FIG. 1, the holder 10 is adapted to hold the receiver R in a generally upright position, in which the receiver R is inclined slightly from a truly vertical position. Moreover, the holder 10 can be steadily rested on a generally horizontal surface, as shown in FIG. 1.

In a second orientation, in which the holder 10 is shown in FIG. 3, the holder 10 is adapted to hold the receiver R in a generally upright position, in which the receiver R is inclined slightly (and slightly more than in the first orientation) from a truly vertical position. Moreover, the holder 10 can be removably mounted to a generally vertical surface, such as a vertical surface of a window W shown fragmentarily.

Such slight inclination of the appliance from a truly vertical position as is exhibited in either orientation of the holder 10 is not bothersome. The same inclination can be actually advantageous, particularly but not exclusively if the appliance is a television receiver, as exemplified by the receiver R, which thus is inclined at a desirable viewing angle for a sitting or standing viewer.

The holder 10 comprises two pieces, which are molded from a suitable polymer, such as acrylonitrile-butadiene-styrene ("ABS") co-polymer. Thus, the holder 12 comprises a wall piece 12 and a prop 14. The holder 10 also comprises a cloth strap 16.

As shown, the wall piece 12 defines a back wall 20 and a bottom wall 22, each being generally rectangular. The bottom wall 22 extends forwardly and approximately at a right angle from the lower edge of the back wall 20. A portion 24 of the back wall 20 is recessed backwardly, as shown, and is bounded on each side by a vertical slot 26. The slots 26, which receive the strap 16, locate the strap 16 relative to the back wall 20 and relative to a pocket-sized electronic appliance, as exemplified by the receiver R. The slots 26 are longer than the width of the strap 16 so as to permit the strap 16 to be vertically adjusted relative thereto. Moreover, the slots 26 help to keep the strap 16 from becoming disassociated from the wall piece 12, even when the holder 10 is not being used.

The strap 16 passes through the slots 26 and around the lateral edges 28 of the back wall 20. The strap 16 is used to secure a pocket-sized electronic appliance, such as the receiver R, to the back wall 20 with the bottom wall 22 supporting the appliance. Thus, the back wall 20 prevents the appliance from falling backwardly, in either orientation of the holder 10. Also, the strap 16 prevents the appliance from falling forwardly or laterally, in either orientation of the holder 10. The bottom wall 22 prevents the appliance from falling downwardly, in either orientation of the holder 10, if the appliance is not adequately prevented from falling downwardly by the strap 16.

The strap 16, which is made from any suitable cloth, leather, or synthetic leather, has two opposite ends, which are adapted to be releaseably fastened to each other. The opposite ends are provided respectively on opposite faces of the strap 16, with interengagable hook and loop portions of a hook-and-loop fastener, such as a Velcro TM fastener available commercially. Thus, a given end 30 of the strap 16 is provided, on the strap face that faces outwardly when the strap 16 is fastened around the appliance, with loop portions 32 of the hook-and-loop fastener. Also, the opposite end 34 of the strap 16 is provided, on the opposite face of the strap 16, with hook portions 36 of the hook-and-loop fastener. Such fastener enables the opposite ends 30, 32, of the strap 16 to be releaseably fastened to each other, so as to strap the appliance to the back wall 20 if the appliance has a girth within a range of girths that such fastener can accommodate.

The back wall 20 is formed on an upper portion of its back face, as shown, with a transverse upper rib 40, which is reinforced at its opposite ends by gussets 42, and with a transverse lower rib 44, which is reinforced at its opposite ends by gussets 46. The transverse ribs 40, 44, define a transverse slot 48 between such ribs 40, 44.

The prop 14 is shaped as a generally rectangular plate, except for an upper flange 50 extending transversely, as shown. The upper flange 50 fits snugly into the transverse slot 48 so as to assemble the back slot 14 to the back wall 20.

The back prop 14 prevents the holder 10 from tipping backwardly when the holder 10 is rested on a generally horizontal surface. Thus, the lower edge of the back wall 20, where the bottom wall 22 meets the back wall 20, and the lower edge of the back prop 14 rest on such a surface.

As shown in FIGS. 2 and 3, a pair of suction cups 60 are mounted to the prop 14 so as to face backwardly. The suction cups 60 are made of a suitable material, such as a synthetic rubber. Each suction cup 60 has a central hub 62, which is formed integrally thereon, and which is snap-fitted or screwed through a suitable hole 64 in the prop 14 so as to attach such suction cup 60 to the prop 14.

The suction cups 60 are adapted to be removably mounted to a hard, smooth, non-porous surface, such as the facing surface of the window W. Each suction cup 60 has a peripheral tab 66, which facilitates its removal from such a surface. Thus, the suction cups 60 are used to mount the holder 10 removably to a generally vertical surface, in the second orientation of the holder 10.

In the alternative embodiment of FIG. 4, a holder 70 is similar to the holder 10 of the preferred embodiment of FIGS. 1, 2, and 3, except that the back wall 72 of the holder 70 is not recessed. However, the back wall 20 has two vertical slots 74, through which a strap 76 similar to the strap 16 passes.

In the alternative embodiment of FIGS. 5 and 6, a holder 100 for a pocket-sized electronic appliance, as exemplified by the receiver R shown again in phantom lines, is molded as a single piece from a suitable polymer, such as ABS co-polymer.

The holder 100 is molded so as to have a back wall 102, a bottom wall 104, a left side wall 106, a right side wall 108, and a front wall 110, as well as a prop 112. The back, bottom, side, and front walls define an open-topped box 114, into which the appliance can be vertically inserted if its front-to-back and side-to-side measurements are such as to permit it to fit into the box 114. The prop 112 extends from the upper edge of the back wall 102.

As shown, the side wall 106 and the side wall 108 are trapezoidal, and the bottom wall 104 is inclined at a non-perpendicular angle relative to the back wall 102 and to the front wall 110. Thus, when the holder 100 is rested on a generally horizontal surface, as shown in FIG. 6, the bottom wall 104 and the lower edge of the prop 112 engage the surface.

The holder 100 comprises one or more suction cups for mounting the holder 100 to a hard, smooth, non-porous surface. As shown, a suction cup 120, which is similar to one of the suction cups 60, is mounted similarly to the prop 112. The suction cup 120 is adapted to be removably mounted to a hard, smooth, non-porous surface, such as the facing surface of the window W again shown fragmentarily. Thus, the suction cup 120 is used to mount the holder 100 to a generally vertical surface, in the second orientation of the holder 100.

As shown, the front wall 110 is formed with an array of narrow, vertical slots 116, which are positioned where an audio speaker of the receiver R is disposed when the receiver R is inserted into the box 114. Also, the side wall 106 has a notch 118 at its upper edge, where an earphone jack of the receiver R is disposed when the receiver R is inserted into the box 114.

Various modifications may be made in dual-use holders, as described above, without departing from the scope and spirit of this invention.

We claim:

1. A dual-use holder for a pocket-sized electronic appliance or the like, said holder being useful alternatively in a first orientation wherein said holder can be steadily rested on a generally horizontal surface and in a second orientation wherein said holder can be removably attached to a generally vertical surface;

said holder having a back wall, which is adapted to prevent such an appliance from falling backwardly as held by said holder in either orientation, the back wall having a pair of transverse ribs defining a transverse slot, said holder having means for preventing such an appliance from falling forwardly, laterally, or downwardly as held by said holder in either orientation;

said holder having a back prop, which has a transverse flange fitting snugly into the transverse slot to attach the back prop to the back wall at an acute angle with respect to the back wall and which is adapted to prevent said holder from tipping backwardly when said holder in its first orientation is rested on a generally horizontal surface, and at least one suction cup attached to the back prop for removably mounting said holder in its second orientation to a generally vertical surface.

2. The dual-use holder of claim 1 wherein the first-mentioned means comprises a bottom wall, which is integral with the back wall, and which underlies such an appliance as held by said holder.

3. The dual-use holder of claim 2 wherein the first-mentioned means also comprises a strap, which is arranged to strap such an appliance against the back wall.

4. The dual-use holder of claim 3 wherein the strap has two opposite ends, which are adapted to be releaseably fastened to each other.

5. The dual-use holder of claim 4 wherein the opposite ends of the strap are provided respectively, on opposite faces of the strap, with interengagable hook and loop portions of a hook-and-loop fastener, which enables the opposite ends of the strap to be releaseably fastened to each other so as to strap such an appliance to the back wall if the appliance being strapped has a girth within a range of girths that the hook-and-loop fastener can accommodate.

6. The dual-use holder of claim 5 having a pair of suction cups, which are attached to the back prop in side-to-side relation to each other so as to face backwardly, and which are removably attachable to a hard, smooth, non-porous surface.

7. The dual-use holder of claim 2 wherein the first-mentioned means also comprises two side walls, which are spaced laterally from each other, and which are integral with the back and bottom walls, and a front wall, which is integral with the side and bottom walls, the front, back, side, and bottom walls defining an open-topped box, into which such an appliance can be vertically inserted if its front-to-back and side-to-side measurements are such as to permit same to fit into the box.

8. A dual-use holder for a pocket-sized electronic appliance or the like, said holder being useful alternatively in a first orientation wherein said holder can be steadily rested on a generally horizontal surface and in a second orientation wherein said holder can be removably attached to a generally vertical surface;

said holder having a back wall, which is adapted to prevent the appliance from falling backwardly as held by said holder in either orientation, a bottom wall, which is integral with the back wall, and which underlies the appliance as held by said holder, and a strap, which is arranged to strap such an appliance against the back wall for preventing such an appliance from falling forwardly, laterally, or downwardly as held by said holder in either orientation, the back wall having a pair of transverse ribs defining a transverse slot;

said holder having back prop, which has a transverse flange fitting snugly into the transverse slot to attach the back prop to the back wall at an acute angle with respect to the back wall and which prevents said holder from tipping backwardly when said holder is rested on a generally horizontal surface, and a pair of suction cups attached to the back prop for removably mounting said holder to a generally vertical surface.

* * * * *